(12) United States Patent
Fu et al.

(10) Patent No.: US 10,976,598 B2
(45) Date of Patent: Apr. 13, 2021

(54) DISPLAY SUBSTRATE AND MANUFACTURING METHOD THEREOF AND DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Bangran Fu, Beijing (CN); Xingliang Li, Beijing (CN); Huabin Chen, Beijing (CN); Yingqiang Gao, Beijing (CN); Yongzhi Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/587,742

(22) Filed: Sep. 30, 2019

(65) Prior Publication Data

US 2020/0319484 A1    Oct. 8, 2020

(30) Foreign Application Priority Data

Apr. 3, 2019    (CN) .......................... 201910265634.2

(51) Int. Cl.
*G02F 1/1335*    (2006.01)

(52) U.S. Cl.
CPC ...... *G02F 1/133553* (2013.01); *G02F 1/1335* (2013.01); *G02F 2201/123* (2013.01); *G02F 2203/02* (2013.01)

(58) Field of Classification Search
CPC .................................................. G02F 1/133553
See application file for complete search history.

(56) References Cited

U.S. PATENT DOCUMENTS

2017/0023807 A1*   1/2017   Chang-Hasnain ..... G02B 1/002
2019/0196267 A1*   6/2019   Yoo ................... B29D 11/00326

OTHER PUBLICATIONS

Li et al. "Principles and applications of metasurfaces with phase modulation." Opto-Electronic Engineering 44.03 (2017): 255-275. (English translation attached.) 23 pages.

* cited by examiner

*Primary Examiner* — Alexander P Gross
(74) *Attorney, Agent, or Firm* — Leason Ellis LLP (57) ABSTRACT

A display substrate and a manufacturing method thereof and a display panel. The display substrate includes a display area and a reflective layer, and at least a portion of the reflective layer is in the display area. The reflective layer includes a metasurface facing a display side of the display substrate, and the metasurface includes a plurality of convex structures which have metamaterial properties and are scattered.

13 Claims, 8 Drawing Sheets

DISPLAY SUBSTRATE AND MANUFACTURING METHOD THEREOF AND DISPLAY PANEL

This application claims the benefit of Chinese patent application No. 201910265634.2 filed on Apr. 3, 2019, which is hereby entirely incorporated by reference as a part of the present application.

TECHNICAL FIELD

At least one embodiments of the present disclosure relate to a display substrate and a manufacturing method thereof, and a display panel.

BACKGROUND

With a development of display technologies, a display panel has been widely used in human production and life. A reflective display panel has attracted more and more attention due to its advantages of dispensing with backlights, having a low power consumption, or the like. However, the reflective display with the current structure has a low utilization rate of ambient light, a brightness of the displayed image is low, and the display effect is poor.

SUMMARY

At least one embodiment of the present disclosure provides a display substrate, comprising a display area and a reflective layer. At least a portion of the reflective layer is in the display area; and the reflective layer comprises a metasurface facing a display side of the display substrate, and the metasurface comprises a plurality of convex structures which have metamaterial properties and are scattered.

For example, the plurality of convex structures are in an array.

For example, the metasurface further comprises a planar structure directly connected with the plurality of convex structures which are convex with respect to the planar structure, and in a direction away from the planar structure, a width of at least one convex structure of the plurality of convex structures is constant or decreases gradually.

For example, in a direction parallel to a plane where the reflective layer is located, a minimum spacing between adjacent convex structures is less than or equal to a maximum dimension of the least one convex structure.

For example, in a direction parallel to the plane where the reflective layer is located, each of the plurality of convex structures has a dimension ranging from 100 to 200 nm.

For example, in a direction perpendicular to the plane where the reflective layer is located, a cross-section shape of the least one convex structure comprises at least one selected from a group consisting of a triangle, a trapezoid and a segment of a circle.

For example, a shape of the at least one convex structure is a sphere or a spherical cap.

For example, the reflective layer further comprises a base layer, and the base layer comprises a plurality of grooves facing the display side of the display substrate, and the plurality of convex structures are in one-to-one correspondence with the grooves, each of the plurality of convex structures is overlapped with the corresponding groove in a direction perpendicular to a plane that the reflective layer is located and protrudes from a surface of the base layer.

For example, the base layer is made of a porous material.

For example, the base layer is a porous alumina layer or a porous titanium oxide layer.

For example, the display substrate further comprises a plurality of sub-pixels arranged in an array in the display area. Each of the sub-pixels comprises a pixel electrode; the pixel electrode is facing the metasurface of the reflective layer, or on a side of the reflective layer away from the metasurface.

At least one embodiment of the present disclosure provides a display panel, comprising the above display substrate.

For example, the display panel further comprises an opposed substrate and a liquid crystal layer. The opposed substrate and the display substrate are arranged oppositely to form a cell, and the liquid crystal layer is between the opposed substrate and the display substrate.

At least one embodiment of the present disclosure provides a display substrate, the display substrate comprising a display area, and the method comprising: forming a reflective layer at least in the display area, wherein the reflective layer comprises a metasurface facing a display side of the display substrate, and the metasurface comprises a plurality of convex structures which have metamaterial properties and are scattered.

For example, forming the reflective layer comprises: forming a base layer, the base layer comprising a plurality of grooves; applying nanospheres on the base layer, to allow the nanospheres to be in the grooves. Portions of the nanospheres protruding from the groove form the plurality of convex structures.

For example, forming the base layer and applying the nanospheres on the base layer comprises: depositing a metal material to form a metal thin film and oxidizing a surface portion of the metal thin film to form a first metal oxide layer with plural pores, wherein an unoxidized portion of the metal thin film is formed as the base layer; removing the first metal oxide layer, wherein a plurality of grooves corresponding to the plural pores are formed in a surface of the base layer; and applying a suspended solution containing nanospheres on the surface of the base layer and evaporating the suspended solution, to embed the nanospheres in the grooves.

For example, forming a base layer with grooves and applying nanospheres further comprises: oxidizing the surface of the base layer before the suspended solution is applied, to increase a depth of the grooves; and/or etching the surface of the base layer with an etching solution to increase a diameter of the grooves.

For example, the metal material is aluminum; the oxidizing the surface of the base layer and/or oxidizing the surface of the base layer comprises: performing oxidation by taking the metal thin film and/or the base layer as an anode, wherein an oxidation voltage of the anode is 30-50V, a electrolyte is an oxalic acid electrolyte with a concentration of 0.3 mol/L, and a temperature is 5-10° C.

For example, at least one of the nanospheres has a diameter ranging from 100 to 200 nanometers, a diameter of each of the grooves ranges from 150 to 250 nm, and a minimum spacing between adjacent grooves ranges from 100 to 200 nm.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects or equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Currently, an optical integrated device is an important part for information communication, display and computation. With the development of science and technologies, the demands from human for processing and displaying information raise increasingly, which requires devices to be miniaturized and to have a low power consumption. However, traditional optical devices based on natural materials and artificial three-dimensional materials have problems of a large size and a low efficiency. How to realize an efficient electromagnetic optical device on a sub-wavelength scale is an urgent problem to be solved.

An artificial structure design may allow a material to regulate and control light, thus creating a plurality of unusual optical effects, so that the material can have a performance index a natural material does not have, and this material is called as a metamaterial with metamaterial properties which are not determined by constituents of the material, but by the artificial structure.

The metamaterial usually includes scatterers or through pores arranged in accordance with a certain rule, thereby obtaining certain performance indexes, such as a negative refractive index, a near zero refractive index, or the like. A three-dimensional (3D) metamaterial may also be replaced with a two-dimensional (2D) surface, i.e., a metasurface. The metasurface is a 2D structure including artificial atoms which have special electromagnetic properties and are arranged in accordance with a certain rule, can flexibly adjust and control properties of incident light, such as an amplitude, phase, polarization, or the like, and has a strong light field control capability.

A reflective structure is arranged in a reflective display panel. In a case of adequate ambient light, the reflective structure performs display using light rays reflected by a mirror surface, for example, reducing a backlight power consumption or dispensing with backlight by taking the ambient light as the light for display. Therefore, a reflective liquid crystal panel relies heavily on the ambient light, and displays images clearly and brightly when the ambient light is sufficient, but has a significantly lowered effect of displaying images in a case of insufficient ambient light. Moreover, a lighting source which provides light rays for the reflective display panel is basically a line source. In practical applications, it is difficult for the light rays emitted by the lighting source to uniformly illuminate the entire reflective display panel, and a phenomenon of bright center and dark periphery may occur; i.e., in this case, the brightness of the displayed image is distributed nonuniformly, causing the displayed image to have problems such as a low brightness, nonuniform display, or the like.

In the current reflective display panel, it is difficult for the reflective structure to substantially collimate and emit the ambient light which is incident in an oblique direction, which causes the reflective display panel to have a low utilization rate of the incident ambient light, resulting in a low brightness and nonuniform display of the displayed image. Exemplarily, as shown in FIG. 1, when light is reflected on an interface of two media, the following formula (1) below is satisfied:

$$\text{Sin } A = \text{Sin } B + (\lambda \times d\varphi(x))/(2\pi \times dx) \qquad (1)$$

wherein medium 2 has a refractive index greater than medium 1, λ is a wavelength of the light in the medium 1, angle A is an incident angle, angle B is a reflection angle, and dφ(x)/dx is a phase gradient in a tangent direction along a reflecting interface. According to the formula (1), in a case of a constant incident angle A, the reflection angle B may be regulated by controlling a phase distribution φ(x).

Figure 1:
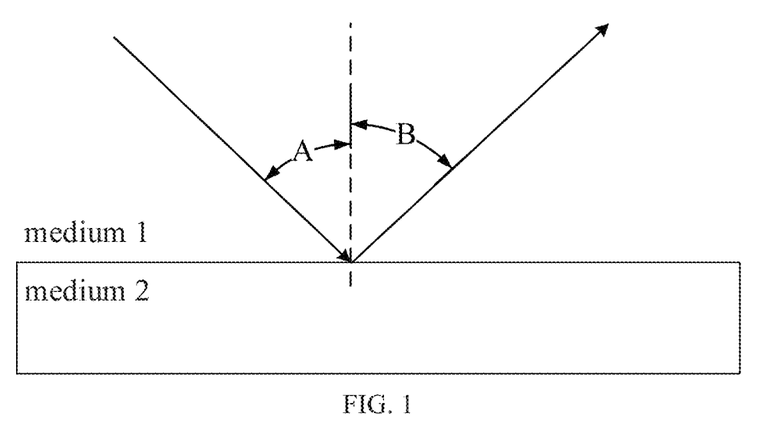
FIG. 1 is a schematic diagram of the law of reflection of light.

For the current reflection structure (e.g., the medium 2 as shown in FIG. 1), mirror reflection of the light occurs at the surface of the reflection structure, and no phase distribution exists, i.e., dφ(x)/dx=0, the incident angle A equal to the reflection angle B. The light emitted to the medium 2 in an oblique direction is reflected still at a same angle, i.e., the reflected light is not perpendicular to the interface of the media 2 and 1. Therefore, a user over against the display panel receives an insufficient amount of light and observes a displayed image with a low brightness.

Figure 2:
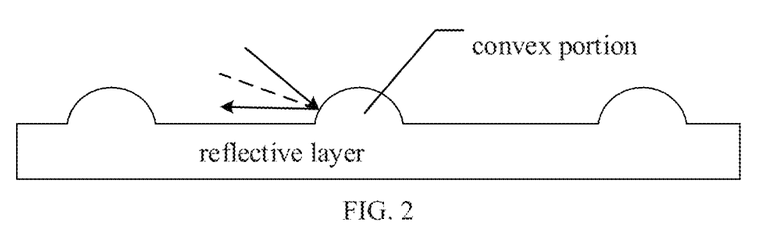
FIG. 2 is a light path diagram of a light reflected by a reflective layer.

For example, in some reflective display panels, a plurality of concavo-convex structures may be arranged on the reflection structure to increase light scattering, so that the reflected light is distributed uniformly. Exemplarily, as shown in FIG. 2, a plurality of convex portions are arranged on the surface of the reflective layer, for light emitted to the convex portions along an oblique direction, the reflected light does not tend to be collimated compared with the incident light, i.e., the reflected light is not emitted in a direction perpendicular to a plane where the reflective layer is located, and this part of light is difficult to be used to display an image. Therefore, a utilization rate of the ambient light by the reflective layer shown in FIG. 2 is also not high enough.

At least one embodiment of the present disclosure provides a display substrate, including a display area and a reflective layer covering at least a portion of the display area. A surface of the reflective layer in the display area and faces a display side of the display substrate is designed as a metasurface which includes a plurality of scattered convex structures with metamaterial properties. The metasurface with plural convex structures has a high reflectivity of light, and can enable the reflected light to tend to transmit along a direction perpendicular to the plane where the reflective layer is located, i.e., an included angle between the reflected light and the plane where the reflective layer is located is less than an included angle between the incident light and the plane where the reflective layer is located, thereby increasing an amount of light that is collimated and emitted from the display substrate, improving the utilization rate of light and the brightness of the displayed image, and improving the display uniformity. In the embodiments of the present disclosure, the "collimated" direction indicates a direction perpendicular or substantially perpendicular to the plane where the reflective layer is located.

Hereinafter, the display substrate, method manufacturing method of the display substrate and a display panel according to at least one embodiment the present disclosure will be described in conjunction with the accompanying drawings.

Figure 3A:
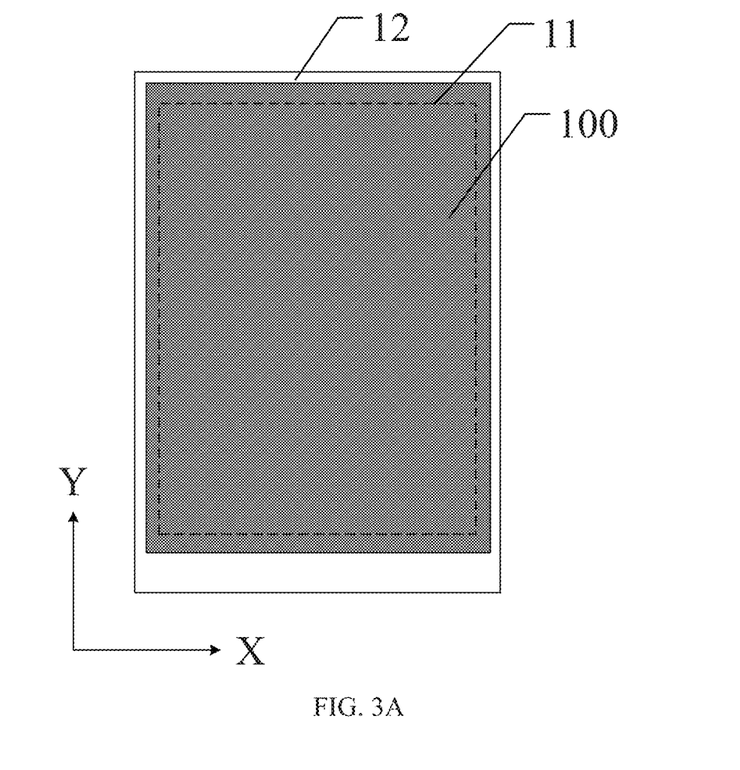
FIG. 3A is a plan view of a display substrate according to at least one embodiment of the present disclosure.
Figure 3B:
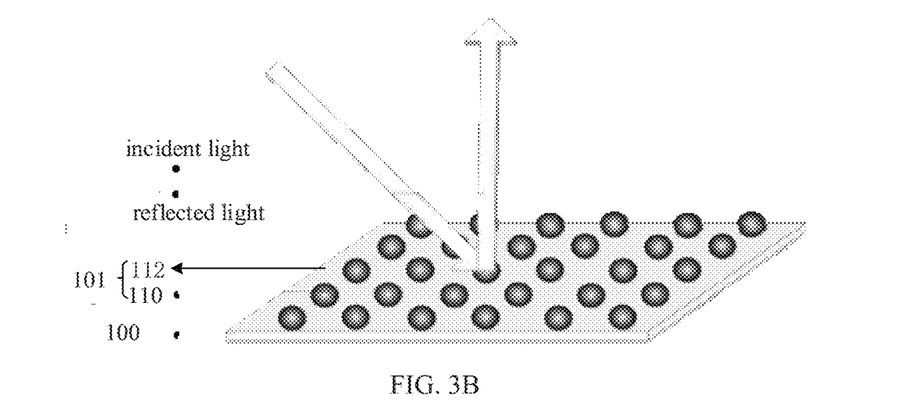
FIG. 3B is a schematic structural view of the reflective layer in the display substrate shown in FIG. 3A.
Figure 3C:
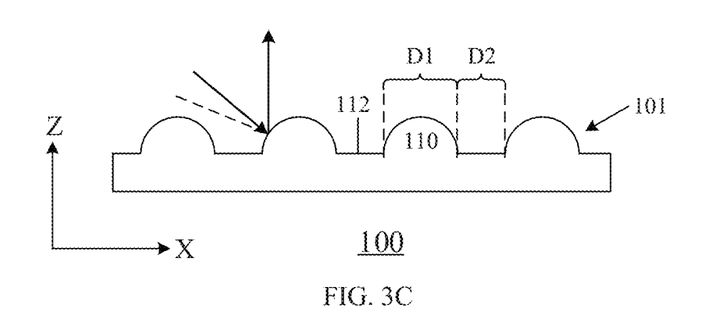
FIG. 3C is a sectional view of a portion of the reflective layer in FIG. 3B.

For example, in at least one embodiment of the present disclosure, as shown in FIGS. 3A, 3B and 3C, a display substrate includes a display area 11, a reflective layer 100 of the display substrate covers the display area 11, and a portion of the reflective layer 100 facing a display side of the display substrate is provided as a metasurface, i.e., the reflective layer 100 includes the metasurface 101 facing the display side of the display base. The metasurface 101 includes a plurality of scattered convex structures 110 with metamaterial properties, and for example, the plural convex structures 110 are arranged in an array. A part of the display substrate located in a dotted box is a display area 11, and a part outside the display area 11 is a non-display area 12 (e.g., including a border area, binding area, etc.). At least part of the reflective layer 100 is located in the display area 11, and as shown in FIG. 3A, the reflective layer further includes the part located in the non-display area 12. For example, in a case where the display panel including the display substrate is designed to be full screen, the display substrate shown in FIG. 3A may also include only the display area 11, without the non-display area.

The metasurface (or metasurface structure) is a two-dimensional periodic sub-wavelength structure whose thickness is less than a corresponding working wavelength (such as, visible light), and controls a phase and amplitude of incident light using interactions of the light and a scatterer, so as to change optical properties of the device. The convex structures in the metasurface are arranged according to a certain rule to form a two-dimensional planar structure (i.e. metasurface structure), thereby regulating and controlling an amplitude, phase, polarization, or the like of the incident light, and having a strong light field control capability. For example, the metasurface structure may generate Mie scattering, so that there is a distinct magnetic dipole, thereby achieving near-field enhancement effects of strong electric field and magnetic field, and also generating resonance, such that under a condition of a resonant frequency, the metasurface structure may reflect electromagnetic waves. In addition, by designing parameters of the convex structure, such as a size, periodic arrangement, or the like, a reflection phase of the electromagnetic wave may be regulated and controlled, so as to control the reflection angle of the light, thereby controlling the amount of light which may be collimated and emitted from the display substrate.

In at least one embodiment of the present disclosure, a material of the convex structure is not limited. Properties of the metasurface are related to parameters of the convex structures, such as a size, arrangement (for example, spacing), and a working wavelength, and a specific material of the convex structure may be designed as needed as long as the material may constitute the nanostructure that meets the size requirement. For example, the convex structure may be made of a high-impedance material, and the metasurface may be a high-impedance metasurface structure, with a high impedance to the electromagnetic wave (light), i.e., a high reflectivity to light. For example, the convex structure may be made of an inorganic transparent material, for example, silicon dioxide, silicon oxynitride, silicon nitride, or the like, and for example, the convex structure may be made of a metal material. For example, a dimer and a polymer containing silicon nanosphere particles are coupled to exhibit a near-field enhancement effect of strong electric field and magnetic field as well as strong magnetic dipole and a little ohmic loss in a visible spectrum. In the case of using silicon nanosphere particles to form a metasurface, reflection to the visible spectrum by the metasurface is significant, for example, the visible light can be totally reflected.

For example, in the display substrate according to at least one embodiment of the present disclosure, the metasurface 101 further includes a planar structure 112 directly connected with convex structures 110. The convex structures 110 are convex with respect to the planar structure 112. In a direction away from the planar structure 112, a width of at least one convex structure 110 is constant or decreases gradually. For example, the convex structure 110 includes a side surface, and an included angle between the side surface and the planar structure 112 is not less than 90 degrees. Exemplarily, as shown in FIG. 3C, by allowing a spacing between adjacent convex structures 110, a size of the convex structure 110 and a reflection wavelength (e.g., visible light) to satisfy a certain relationship, the side surface of the convex structure satisfying the above-mentioned condition may enable the light incident at different angles along the oblique direction to be emitted in a collimated direction, or enable the reflected light to tend to the collimated direction, increasing the amount of light emitted in the collimated direction of the display substrate. It should be noted that, in FIG. 3C, under the action of the metasurface, a phase distribution φ(x) of light needs to be considered when the light is reflected at the reflecting interface, i.e., the incident light and the reflected light are at the same side of a normal line of the reflecting interface (the dotted line shown in FIG. 3C), and the reflection angle is greater than the incident angle. For example, in the direction perpendicular to the plane where the reflective layer is located, in a case where the cross section of the convex structure is rectangular, the included angle between the side surface of the convex structure and the planar structure is 90 degrees; in a case where the cross section of the convex structure has a shape of a trapezium, the included angle between the side surface of the convex structure and the planar structure is an obtuse angle.

For example, in the display substrate according to at least one embodiment of the present disclosure, the convex structures are the same as each other, and in a direction parallel to the plane where the reflective layer (i.e., planar structure 112) is located, a minimum spacing between adjacent convex structures is less than or equal to a maximum dimension of the convex structure. For example, in the direction parallel to the plane where the reflective layer (i.e., planar structure 112) is located, a minimum spacing between adjacent convex structures is less than or equal to a maximum dimension of any one of the two adjacent convex structures. Exemplarily, as shown in FIG. 3C, in the direction (X axis direction as shown) parallel to the plane where the reflective layer is located, the maximum dimension D1 of the convex structure is greater than a minimum spacing between adjacent convex structures 110. For example, a spacing between any two adjacent convex structures 110 is same. Under the above-mentioned conditions, electric fields between the convex structures of the reflective layer are superimposed with one another, which causes strong coupling, thereby obviously reflecting light, i.e., the reflectivity of light is high. Additionally, in the above-mentioned formula 1, the value of phase distribution φ(x) is related to the size of the convex structure and the spacing between adjacent convex structures, i.e., by designing the size of the convex structure and the spacing between adjacent convex structures, the phase distribution φ(x) may be designed, thereby controlling the reflection angle of light in the convex structure.

For example, in the display substrate according to at least one embodiment of the present disclosure, in the direction parallel to the plane where the reflective layer is located, the convex structure has an average dimension ranging from 100 to 400 nm, for example, 100 nm to 200 nm, a spacing between adjacent convex structures ranges from 10 nm to 50 nm, for example, 10 nm to 20 nm. For example, the convex structures 110 are arranged in a foursquare array. For example, a thickness of the metasurface 101 ranges from 150 nm-350 nm; for example, the thickness is 200 nm. For example, each convex structure 110 is configured to be part of a silicon nanometer ball. There is strong coupling interaction between or among the silicon nanometer balls, which broadens an effective dipole moment of the silicon nanometer ball array, thereby enabling the metasurface 101 to have a high reflexivity. Within this numerical range, the reflective layer has a high reflectivity to light within the range of the visible wavelength, and light incident along oblique directions is reflected on the convex structure, and then reflected in the collimated direction. For example, within this numerical range, the reflectivity to the visible light (light of 400 to 700 nm) may be high. For example, the light with a wavelength ranging from 510 to 620 nm will be totally reflected on the metasurface 101 of the reflective layer.

For example, in at least one embodiment of the present disclosure, the convex structures are arranged in an array, the array may be regular or irregular. For example, the convex structures may be arranged periodically or not periodically. For example, the convex structures may also be designed to have approximately equal dimensions. As such, the regions of the metasurface of the reflective layer have substantially a same phase distribution φ(x), i.e., the reflectivities of the incident light by the reflective layer are distributed uniformly, such that the brightness of the displayed image is distributed uniformly to improve the display effects.

In at least one embodiment of the present disclosure, at least part of a side surface of the convex structure may be an inclined surface, and an included angle between the inclined surface and the plane where the reflective layer is located is an obtuse angle, which helps the light rays incident in the oblique direction reflected by the inclined surface to transmit in the collimated direction. For example, in the display substrate according to at least one embodiment of the present disclosure, in the direction perpendicular to the plane where the reflective layer is located, a shape of the cross section of the convex structure is at least one selected from a group consisting of a triangle, a trapezium and a segment of a circle.

For example, in some embodiments of the present disclosure, as shown in FIG. 3C, the cross section of the convex structure 110 is a segment of a circle, i.e., a portion of a circle that is cut by a straight line. In practical applications, an incident angle of ambient light on the reflective layer is within a range of approximately 60 degrees, and the incident angle of most of the ambient light on the reflective layer is within a range of approximately 30 degrees. According to the above-mentioned formula 1, the greater the incident angle of light on the interface, the greater the reflection angle. For the convex structure 110 with the above-mentioned shape, light incident at an angle within the above-mentioned range may have a great incident angle at a specific position on the cambered surface of the convex structure 110. Correspondingly, the reflection angle is greater, and more reflected light tends to be collimated. For example, for the light incident with an inclination angle not greater than 60 degrees (for example, the inclination angle not greater than 30 degrees), part of the reflected light may be emitted in the collimated direction. It should be noted that the "inclination angle" of the light incident in the oblique direction takes a direction perpendicular to the plane where the reflective layer is located as reference, and the less the "angle of inclination", the more the incident light rays tend to be collimated. For example, light incident at an inclination angle of 0 degree is transmitted in the direction perpendicular to the plane where the reflective layer is located.

Figure 4:
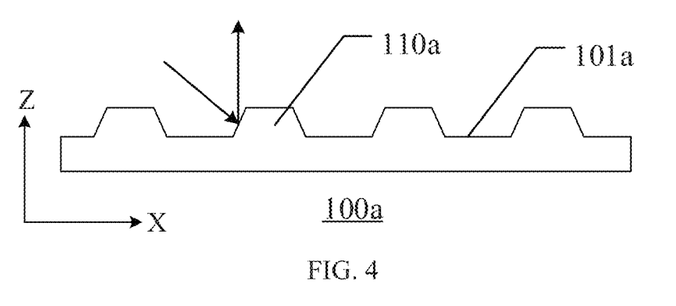
FIG. 4 is sectional view of the reflective layer in another display substrate according to at least one embodiment of the present disclosure.

For example, in some other embodiments of the present disclosure, as shown in FIG. 4, the metasurface 101a of the reflective layer 100a includes the convex structure 110a having a cross-sectional shape of a trapezium, such that the ambient light obliquely incident is reflected on the side surface (side of the isosceles trapezium in FIG. 4) of the convex structure 110a, and then at least part of the reflected light may be emitted in the collimated direction and is not shielded.

Hereinafter, the technical solution in at least one embodiment of the present disclosure will be described by taking the cross-sectional shape of the convex structure as a segment of a circle shown in FIG. 3C.

For example, in the display substrate according to at least one embodiment of the present disclosure, in the case where the shape of the cross section of the convex structure is a segment of a circle, the shape of the convex structure may be a sphere or a spherical cap (i.e. a segment of a sphere). Exemplarily, as shown in FIG. 3C, the shape of the convex structure 110 is a spherical cap, a hemisphere for example. Thus, for all light rays incident in the oblique direction, compared with the incident direction, the reflected light tends to be more collimated.

Figure 5:
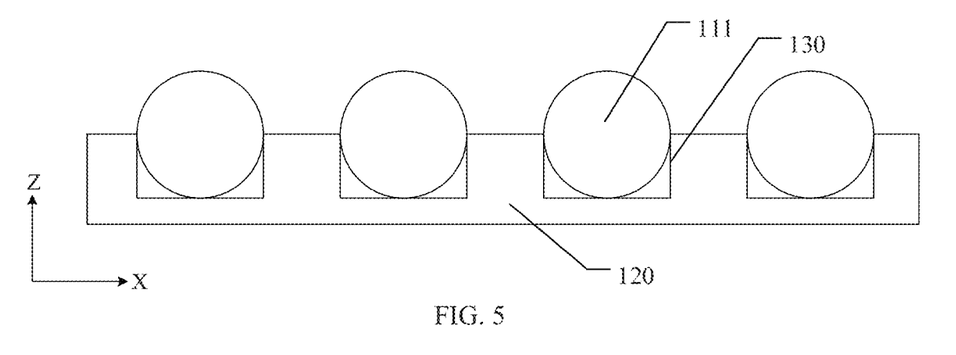
FIG. 5 is sectional view of the reflective layer in another display substrate according to at least one embodiment of the present disclosure.

For example, in the display substrate according to at least one embodiment of the present disclosure, the reflective layer further includes a base layer, the surface of the base layer facing the display side of the display substrate has a plurality of grooves, and the convex structures are in one-to-one correspondence with the grooves and protrude from the surface of the base layer. For example, each of the convex structures coincides or is overlapped with the corresponding groove in the direction perpendicular to the plane that the base layer is located. Exemplarily, as shown in FIG. 5, the surface of the base layer 120 of the reflective layer is provided with a plurality of grooves 130, spheres 111 are embedded in the grooves 130, and a depth of the groove 130 is less than a diameter of the sphere 111, so a part of the sphere 111 is located in the groove 130 and other portions protrude from the groove 130. That is, the part of the sphere 111 protruding from the surface of the base layer 120 forms the convex structure 110 shown in FIG. 3C.

For example, in the display substrate according to at least one embodiment of the present disclosure, the base layer is made of a porous material. As such, grooves may be formed by pores in the porous material layer, or the pores are taken as grooves, and then spheres are put in the grooves to obtain the convex structure, which simplifies the manufacture process and lower costs. The manner of forming the porous material layer may refer to the related description in the following embodiments (for example, the embodiments shown in FIGS. 9A to 9E), and details are not described here.

For example, in the display substrate according to at least one embodiment of the present disclosure, the type of the porous material layer as the base layer is not limited. For example, the base layer may be a porous alumina layer, a porous titanium oxide layer, or other types of porous material layers.

In some other examples, the reflective layer 100 may also have an integral structure; i.e., the base layer 120 may also have an integrated structure with the convex structure 110, and no interface exists between the base layer 120 and the convex structure 110. For example, the reflective layer 100 is made of an inorganic insulating material, for example, silicon oxide, nitride or oxynitride.

Figure 6A:
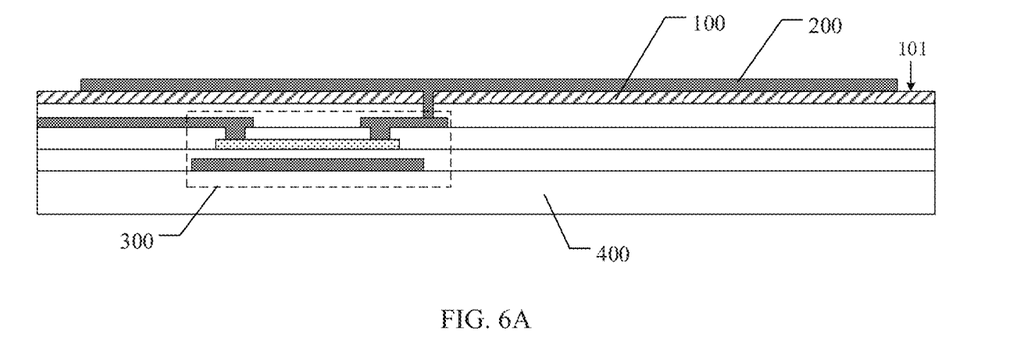
FIG. 6A is a sectional view of a display substrate according to at least one embodiment of the present disclosure.

In at least one embodiment of the present disclosure, other structures of the display substrate are not limited, and may be designed based on a specific required function of the display substrate. For example, the display substrate according to at least one embodiment of the present disclosure may be designed as an array substrate, the array substrate may include a plurality of sub-pixels arrayed in the display area, and each of the sub-pixels is provided therein with a pixel electrode. Exemplarily, FIG. 6A shows one sub-pixel of the array substrate, the sub-pixel including a thin film transistor 300 (indicated by the dotted box) and a pixel electrode 200 located on a base substrate 400. The pixel electrode 200 may be electrically connected with a drain electrode or a source electrode of the thin film transistor 300. For example, the side of the pixel electrode 200 away from the base substrate 400 is the display side of the display substrate.

For example, in some embodiments of the present disclosure, the pixel electrode 200 in the display substrate is disposed to face the metasurface 101 of the reflective layer. Exemplarily, as shown in FIG. 6A, the reflective layer 100 is located between the pixel electrode 200 and the base substrate 400, and the surface of the reflective layer 100 facing the pixel electrode 200 is the metasurface 101. For example, the pixel electrode 200 is a transparent electrode. As such, the ambient light may be reflected by the metasurface 101 of the reflective layer 100 after passing through the pixel electrode 200.

For example, in the case where the pixel electrode is a transparent electrode, its material may include indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO), or the like.

Figure 6B:
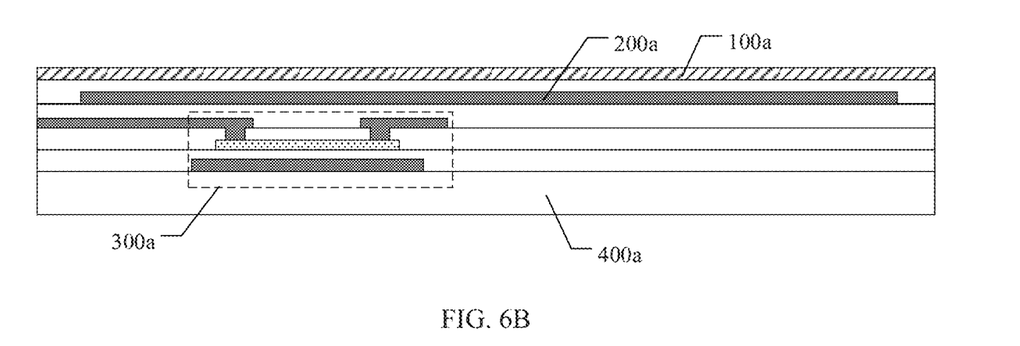
FIG. 6B is a sectional view of another display substrate according to at least one embodiment of the present disclosure.

For example, in some other embodiments of the present disclosure, the pixel electrode in the display substrate is located at a side of the reflective layer apart from the metasurface 101. Exemplarily, as shown in FIG. 6B, the pixel electrode 200a is located between the reflective layer 100a and the base substrate 400a (or the thin film transistor 300a), and the surface of the reflective layer 100a away from the pixel electrode 200a is provided with the metasurface structure. In practical applications, due to limitations of the process or the like, the reflective layer 100a may not reflect all of the incident light, i.e., some of the light rays will transmit through the reflective layer 100a. For example, the pixel electrode 200a may be provided as a reflective electrode, so as to cooperate with the reflective layer 100a to reflect the incident light, and increase the utilization rate of the ambient light. For example, a planarization layer may be disposed between the pixel electrode and the reflective layer to improve a flatness of the reflective layer, such that the regions of the reflective layer have substantially the same reflectivity, and the uniformity of the brightness distribution of the reflected light is improved.

For example, in a case where the pixel electrode is a reflective electrode, the pixel electrode may be a single-layer reflective electrode or a composite structure consisting of a plurality of film layers. For example, the pixel electrode may be formed by stacking a transparent electrode and a metal reflective layer; for example, the metal reflective layer may be a film layer made of metal, such as aluminum, copper, silver, chromium, or the like.

For example, in some other embodiments of the present disclosure, the base layer of the reflective layer in the display substrate is made of a conductive material (e.g., aluminum, or the like). As such, the reflective layer may serve as a pixel electrode of sub-pixels. For example, the reflective layer may include a plurality of reflective parts spaced apart from each other, and the reflective parts are in one-to-one correspondence with the sub-pixels to function as the pixel electrode, thereby simplifying the manufacturing process of the display substrate and lowering costs.

At least one embodiment of the present disclosure provides a display panel, including the display substrate according to any one of the above-mentioned embodiments. The display substrate is a reflective display substrate, such that the display panel is a reflective display panel.

For example, in some embodiments of the present disclosure, the display panel is a reflective electronic paper display panel. For example, the display panel further includes an opposite substrate which is arranged opposite to the reflective display substrate to form a cell. A plurality of chambers are defined between the display substrate and the opposite substrate, and each of the chambers corresponds to one sub-pixel. Charged light shielding particles may be provided in the chamber, a control electrode is arranged on the display substrate and/or the opposite substrate to generate an electric field, and the electric field is used to drive the light shielding particles to distribute in each chamber, so that the light transmittance of each chamber is controlled, and gray scales for display of the sub-pixels are regulated.

Figure 7A:
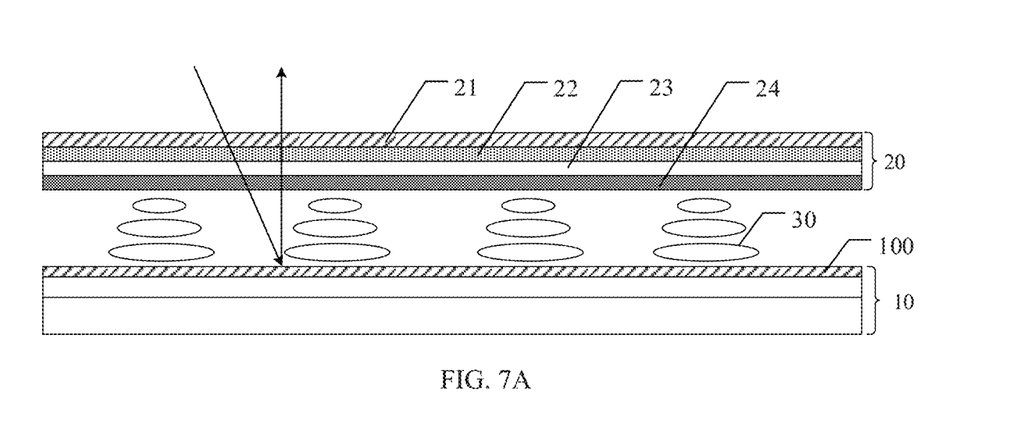
FIG. 7A is a sectional view of a display substrate in a display state according to at least one embodiment of the present disclosure.

For example, in some embodiments of the present disclosure, the display panel is a reflective liquid crystal display panel. For example, the display panel further includes an opposed substrate and a liquid crystal layer, the opposed substrate and the display substrate are arranged oppositely to form a cell, and the liquid crystal layer is located between the opposed substrate and the display substrate. Exemplarily, as shown in FIGS. 7A and 7C, the display panel includes the display base 10 and the opposed substrate 20 which are arranged oppositely to form a cell, and the liquid crystal layer 30 is sandwiched between the display base 10 and the opposed substrate 20. The display substrate 10 may be an array substrate and comprises a plurality of thin film transistors, and the opposed substrate may be a color filter substrate correspondingly. For example, the structure of the display substrate 10 may refer to the related descriptions in the above-mentioned embodiments (for example, the embodiments shown in FIGS. 6A and 6B), and details are not described here.

For example, in some embodiments of the present disclosure, as shown in FIGS. 7A and 7C, the opposed substrate 20 of the display panel includes an electrode 24, a polarizing layer 21 and a quarter-wave plate 22, and the polarizing layer 21 enables the transmitted light to be linearly polarized light. The polarizing layer 21 and the quarter-wave plate 22 are arranged sequentially along a direction the display side of the display panel directing the side opposite to the display side. For example, the opposed substrate 20 may further include a color filter layer 23, and the electrode 24 may cooperate with the pixel electrode (not shown, referring to the pixel electrode 200 in FIG. 6A) in the display base 10 to control a state of the liquid crystal layer, and further control the reflectivity of the liquid crystal layer 30. In a case where the reflectivity of the liquid crystal layer 30 satisfies certain conditions, a thickness of the liquid crystal layer 30 is designed to allow the liquid crystal layer 30 to be equivalent to a quarter-wave plate. The display panel with the above-mentioned structure may achieve bright-state display and dark-state display.

Figure 7B:
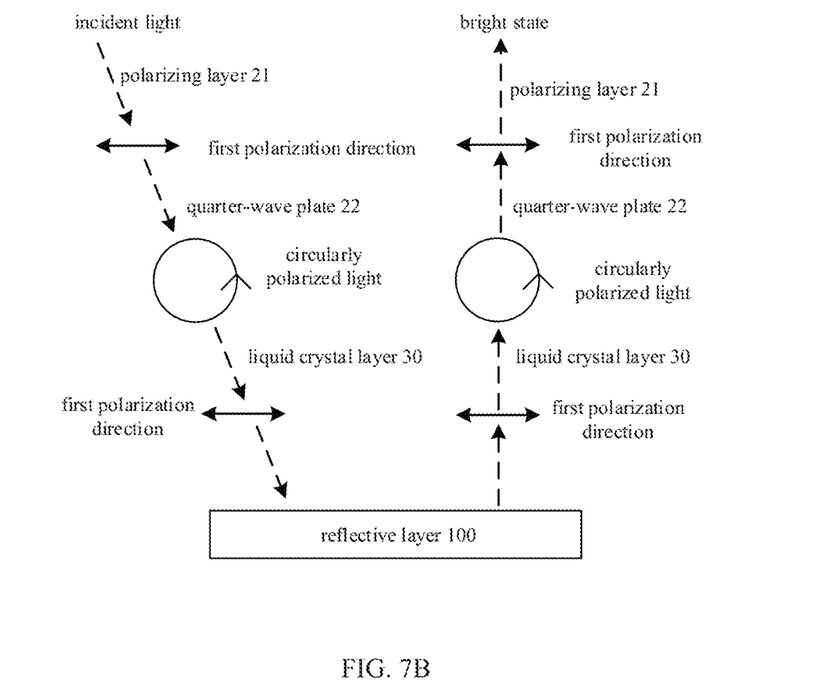
FIG. 7B is a light path diagram of the display panel shown in FIG. 7A.
Figure 7C:
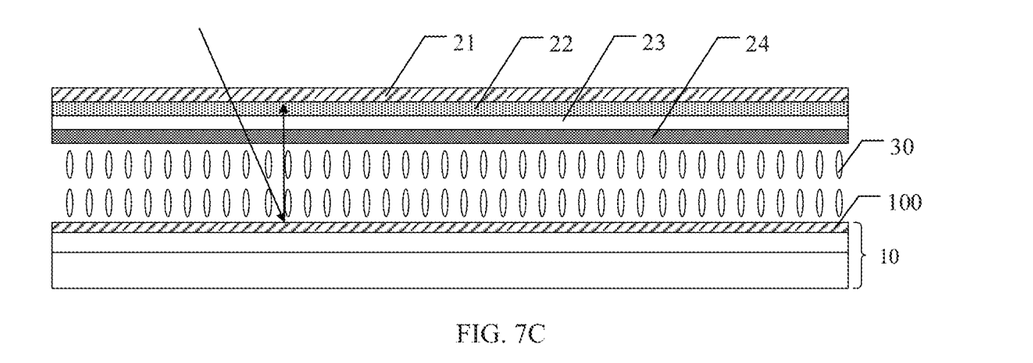
FIG. 7C is a sectional view of the display panel in another display state shown in FIG. 7A.

Exemplarily, as shown in FIGS. 7A and 7B, the liquid crystal layer 30 is equivalent to the quarter-wave plate when not electrified. Incident light (ambient light) transmits through the polarizing layer 21 and then converts into linearly polarized light having a first polarization direction. The linearly polarized light transmits through the quarter-wave plate 22 and then converts into circularly polarized light (for example, left circularly polarized light). The circularly polarized light converts into linearly polarized light having the first polarization direction after transmitting through the liquid crystal layer 30, and the linearly polarized light converts into circularly polarized light (left circularly polarized light) by the liquid crystal layer 30 after being reflected by the metasurface of the reflective layer 100. The circularly polarized light converts into linearly polarized light having the first polarization direction after transmitting through the quarter-wave plate 22, and the linearly polarized light may be emitted from the polarizing layer 21. As such, the display panel achieves the bright-state display.

Figure 7D:
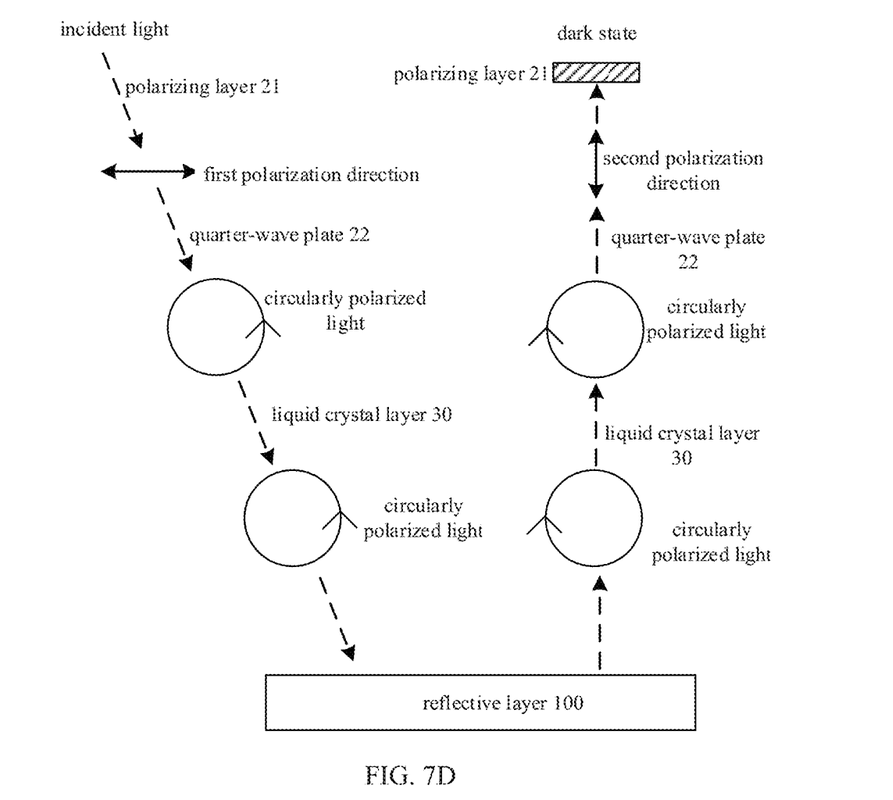
FIG. 7D is a light path diagram of the display panel shown in FIG. 7C.

Exemplarily, as shown in FIGS. 7C and 7D, a voltage is applied to the liquid crystal layer 30 through the electrode 24 and the pixel electrode in the display substrate, liquid crystal molecules of the liquid crystal layer 30 are twisted, and a refractive index of the liquid crystal layer 30 is changed, such that the liquid crystal layer 30 cannot be equivalent to the quarter-wave plate. As such, the ambient light converts into linearly polarized light having a first polarization direction after transmitting through the polarizing layer 21, and the linearly polarized light converts into circularly polarized light (for example, left circularly polarized light) after transmitting through the quarter-wave plate 22. The circularly polarized light does not change states after transmitting through the liquid crystal layer 30, and the circularly polarized light becomes right circularly polarized light after being reflected by the reflective layer. The right circularly polarized light transmits through the liquid crystal layer 30 and does not change states, and the right circularly polarized light converts into linearly polarized light having a second polarization direction which is perpendicular to the first polarization direction, after transmitting through the quarter-wave plate 22. As such, the linearly polarized light having the second polarization direction cannot transmit through the polarizing layer 21, i.e., the ambient light incident on the display panel cannot be emitted, and the display panel achieves the dark-state display.

Figure 8:
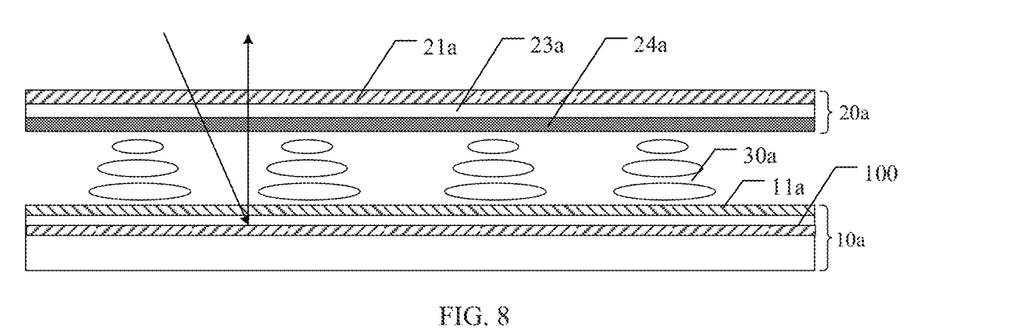
FIG. 8 is a sectional view of another display substrate according to at least one embodiment of the present disclosure.

For example, in some embodiments of the present disclosure, as shown in FIG. 8, the opposed substrate 20a of the display panel includes an electrode 24a and a first polarizing layer 21a; the display base 10a includes a second polarizing layer 11a, and the second polarizing layer 11a and the first polarizing layer 21a are located at two opposite sides of the liquid crystal layer 30a. For example, the first polarizing layer 21a enables the transmitted light to have a first polarization direction, and the second polarizing layer 11a enables the transmitted light to have a second polarization direction which is perpendicular to the first polarizing direction. For example, the opposed substrate 20a may further include a color filter layer 23a, and the electrode 24a may cooperate with the pixel electrode (not shown, referring to the pixel electrode 200 in FIG. 6A) in the display base 10a to control a twisting degree of the liquid crystal molecules in the liquid crystal layer.

Exemplarily, in a case where no voltage is applied to the electrode 24a and the pixel electrode in the display base 10a, the ambient light is transmitted through the first polarizing layer 21a and then converted into linearly polarized light having a first polarization direction, this linearly polarized light is transmitted through the liquid crystal layer 30a, without changing its polarization direction, and is absorbed by the second polarizing layer 11a, i.e., the ambient light incident on the display panel cannot be emitted, and the display panel achieves the dark-state display. In a case where a voltage is applied to the electrode 24a and the pixel electrode in the display base 10a, the liquid crystal layer enables a polarization direction of transmitting light to be twisted by 90 degrees, and the ambient light is transmitted through the first polarizing layer 21a and then converted into linearly polarized light having a first polarization direction. The linearly polarized light has a second polarization direction after transmitting through the liquid crystal layer 30a, and then transmits through the second polarizing layer 11a.

The linearly polarized light is reflected by the metasurface of the reflective layer 100 and then transmits through the second polarizing layer 11a, converts into linearly polarized light with the first polarization direction after transmitting through the liquid crystal layer 30a, and then transmits through the first polarizing layer 21a. As such, the display panel achieves the bright-state display.

For example, the display panel may be any product or component with a display function, such as a television, a digital camera, a mobile phone, a watch, a tablet, a notebook, a navigator, or the like.

It should be noted that, for clarity, not all the structures of the display substrate and the display panel in the embodiments are described in the present disclosure. In order to realize the necessary functions of the display substrate and the display panel, a person skilled in the art may provide other structures (for example, a touch structure, a light splitting device to realize naked-eye 3D display, or the like) according to a specific application scenario, and the embodiments of the present disclosure are not limited thereto.

At least one embodiment of the present disclosure provides a manufacturing method of a display substrate, the display substrate including a display area, the method including: forming a reflective layer at least in the display area, the reflective layer including a metasurface facing a display side of the display substrate, the metasurface including a plurality of scattered convex structures with metamaterial properties. In the display substrate obtained by using the method in the above-described embodiment, the metasurface with the plurality of convex structures has a high reflectivity to light, and may enable the reflected light to tend to transmit in a direction perpendicular to a plane where the reflective layer is located, i.e., the included angle between the reflected light and the plane where the reflective layer is located is less than the included angle between the incident light and the plane where the reflective layer is located, thereby increasing an amount of light of the display substrate emitted in the collimated direction, improving the utilization rate of light and the brightness of the displayed image.

For example, in the manufacturing method according to at least one embodiment of the present disclosure, the forming the reflective layer includes: forming a base layer and forming a plurality of grooves in a surface of the base layer; applying nanospheres on the base layer, such that the nanospheres are located in the grooves, and the portion of the nanosphere protruding from the groove form the convex structures. The nanospheres and the grooves of the base layer may be self-assembled, which simplifies the manufacturing process and lowers the cost.

For example, in the manufacturing method according to at least one embodiment of the present disclosure, the forming a base layer with grooves and applying the nanospheres includes: depositing a metal material to form a metal thin film, and oxidizing a surface portion of the metal thin film to form a first metal oxide layer with plural porous, an unoxidized portion of the metal thin film as the base layer; removing the first metal oxide layer, forming a plurality of grooves corresponding to the plural pores in the surface of the base layer; applying a suspended solution containing nanospheres on the surface of the base layer and evaporating the suspended solution, to embed the nanospheres in the grooves. As such, by forming the porous material layer, and forming the pores in the porous material layer as the grooves or taking the pores as the grooves, spheres are applied in the grooves to obtain convex structures, which simplifies the manufacturing process, and lowers costs.

For example, in the manufacturing method according to at least one embodiment of the present disclosure, the forming a base layer with grooves and applying nanospheres further includes: oxidizing the surface of the base layer before the suspended solution is applied, to increase a depth of the groove; and/or etching the surface of the base layer with an etching solution to increase a diameter of the grooves. As such, a depth and diameter of the groove may be increased to ensure that the nanospheres are embedded in the grooves.

For example, in the manufacturing method according to at least one embodiment of the present disclosure, the metal material is aluminum, the oxidizing the surface of the base layer and/or oxidizing the surface of the base layer includes: performing oxidation by taking the metal thin film and/or the base layer as an anode, to obtain porous alumina. An oxidation voltage of the anode is 30-50V, an electrolyte is an oxalic acid electrolyte with a concentration of 0.3 mol/L, and a temperature is 5-10° C.

For example, in the manufacturing method according to at least one embodiment of the present disclosure, the nanosphere may be a sphere or a similar sphere with a diameter of an order of hundred nanometers. For example, the nanosphere has a diameter ranging from 100 to 200 nanometers, the diameter of each of the groove ranges from 150 to 250 nm, and a minimum spacing between adjacent grooves range from 100 to 200 nm. Within this numerical range, the light with a wavelength ranging from 510 to 620 nm will be totally reflected on the metasurface of the reflective layer. Within this numerical range, the reflective layer has a high reflectivity to the light within the visible wavelength range, and part of the light rays incident in the oblique direction is reflected on the convex structure and then reflected in the collimated structure. For example, within this numerical range, it is possible to have a high reflectivity to the visible light (with a wavelength of 400 to 700 nm).

The specific structure of the display substrate obtained with the above-mentioned manufacturing method may refer to the related descriptions in the above-mentioned embodiments (e.g., the embodiments shown in FIGS. 3A-3C, FIG. 4, FIG. 5, FIGS. 6A and 6B), and is not repeated here.

Hereinafter, as shown in FIGS. 9A-9F, the method of manufacturing the display substrate will be described taking manufacturing the reflective layer as shown in FIG. 5 as an example.

Figure 9A:
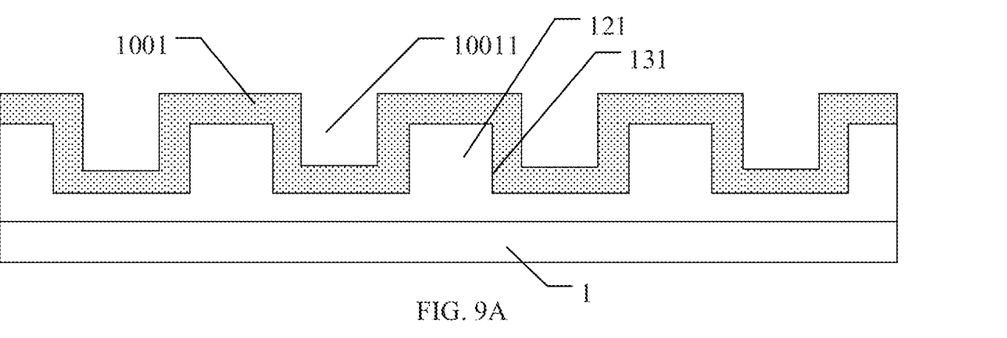
FIG. 9A-FIG. 9F are process diagrams of a manufacturing method of a display substrate according to at least one embodiment of the present disclosure.
Figure 9B:
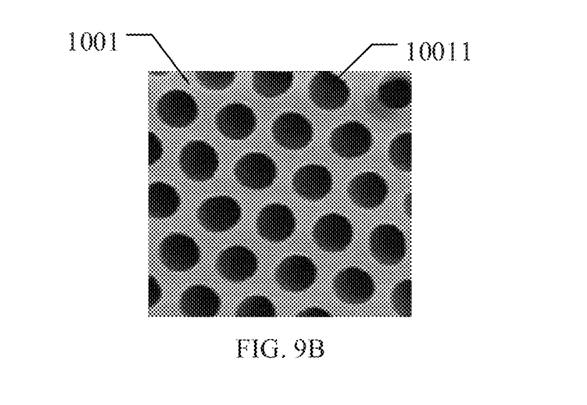

FIG. 9A is a sectional view of the oxidized metal thin film. As shown in FIG. 9A, a metal material is deposited on a base 1 to form a metal thin film, a surface portion of the metal thin film is oxidized to form a first metal oxide layer 1001 with plural pores 10011, and a portion of the metal thin film which is not oxidized forms a first base layer 121. Correspondingly, a plurality of grooves 131 corresponding to the plural pores 10011 are formed in the surface of the first base layer 121. FIG. 9B is a schematic diagram of the oxidized metal thin film under an electron microscope.

For example, the metal thin film may be aluminum, and may be formed using magnetron sputtering, with a thickness of 0.5 µm to 2 µm, such as 0.8 µm, 1 µm, 1.2 µm, 1.6 µm, or the like. For example, the base 1 with the metal thin film is immersed in the oxalic acid electrolyte with a concentration of 0.3 mol/L, and anodic oxidation is performed taking platinum (Pt) as a cathode and the metal thin film as an anode, at the temperature of 5-10° C. and at a voltage of 30-50V for 4-8 hours. A porous alumina film is formed after being subjected to the one-step anodic oxidation.

It should be noted that the base 1 may include all structures of the display substrate located below the reflective layer (for example, the base substrate 400a, the thin film transistor 300a, the pixel electrode 200a, or the like as shown in FIG. 6B).

Figure 9C:
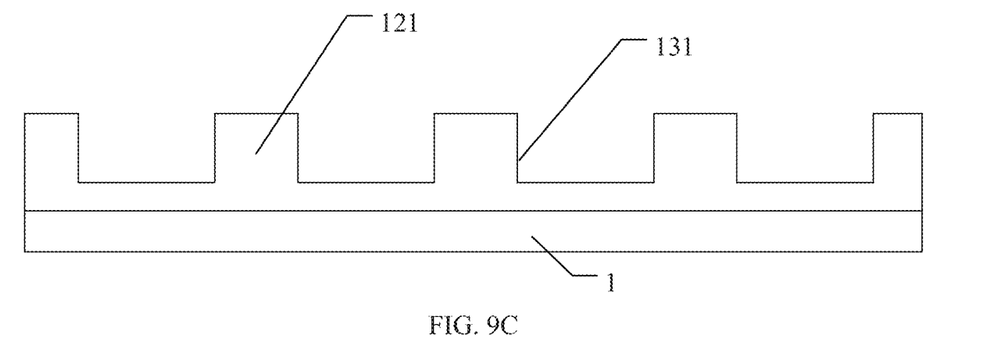

As shown in FIGS. 9A-9C, the first metal oxide layer 1001 is removed and the first base layer 121 having the first groove 131 is reserved. For example, in a case where the metal thin film is aluminum, after the above-mentioned oxidation, the structure in FIG. 9B is immersed in a mixed solution including phosphoric acid with a mass fraction of about 6% and chromic acid with a mass fraction of about 1.8% at a temperature of about 60° C. for about 4 hours to remove the first metal oxide layer 1001 (alumina layer) on the first base layer 121.

It should be noted that in the above-mentioned oxidation process (as shown in FIGS. 9A-9B), there are two processes for forming the porous alumina layer: a process of forming O/E (Oxide/Electrolyte) interface pores of the alumina/electrolyte, and a process of forming M/O (Metal/Oxide) interface pores of aluminum/alumina. At the beginning of the one-step anodic oxidation, at the O/E interface, the pores are randomly formed at the surface defects, rendering the generated porous alumina relatively disordered; meanwhile, at the M/O interface, the oxide at the bottom may only expand laterally, and pore passages continue to grow under the action of such an expansion stress, so the force between adjacent pore passages is a mechanical stress generated by the expansion of alumina at the M/O interface. Such a stress between pore walls enables the pore passages to self-organize to be densely stacked in a way of hexagonal prisms, thereby forming the pores which are arranged orderly and periodically. Correspondingly, after the alumina layer is removed, the exposed first grooves 131 are also arranged orderly and periodically (arranged in an array). In the above-mentioned expressions, "O" denotes an oxide material, for example, the above-described alumina; "M" represents a metal material, for example, the above-described aluminum; "E" denotes a liquid material, such as the above-mentioned electrolyte.

Figure 9D:
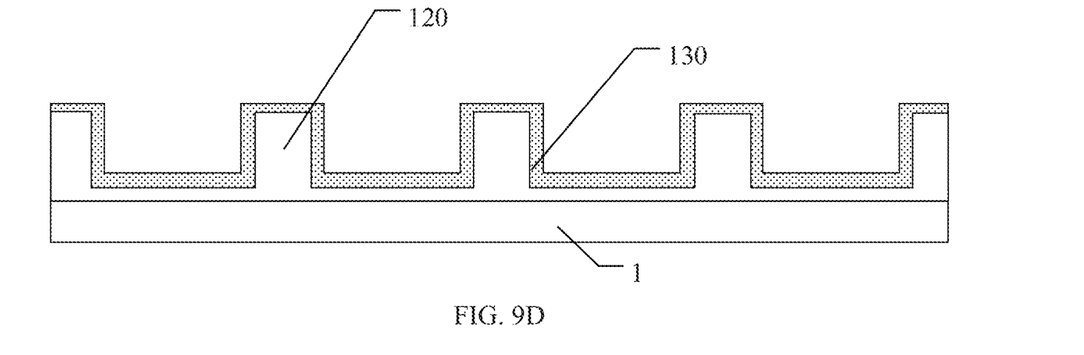
Figure 9E:
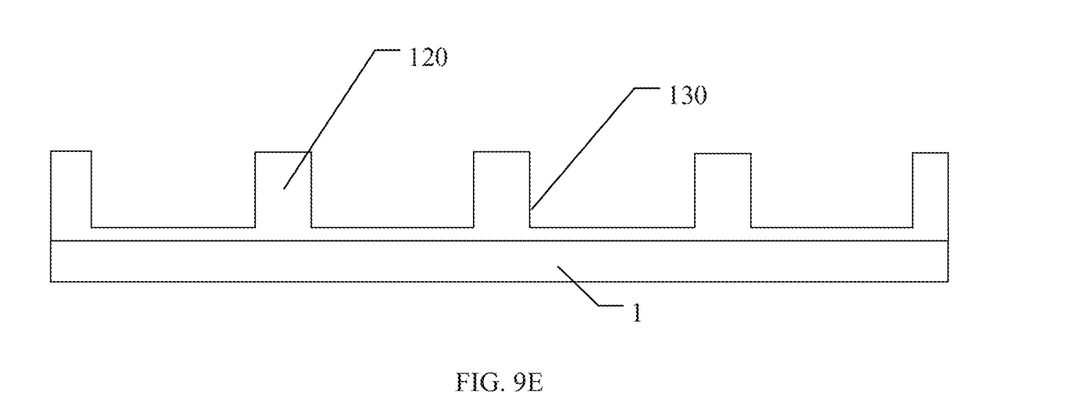

As shown in FIGS. 9C, 9D and 9E, a surface of the first base layer 121 is oxidized, i.e., a porous oxide layer thin film is formed, wherein the pores may increase a depth of the groove 130. Then the oxidized part is etched, and the remaining part forms the base layer 120 with grooves 130. The manner and conditions of oxidation may refer to the relevant descriptions in the embodiments shown in FIGS. 9A-9B. For example, the oxidized first base layer 121 may be immersed in an oxalic acid solution having a mass fraction of about 5% at a temperature of about 35° C. for about 30 minutes. By adjusting the reaction time, a dimension of the formed groove (depth and diameter) may be adjusted. For example, the groove 130 may have a depth of 50 nm to 100 nm, and a diameter of 150 nm to 250 nm, and a minimum spacing between adjacent grooves may range from 100 nm to 200 nm.

It should be noted that in the process of oxidizing the first base layer, only a surface of the first base layer 121 may be oxidized as shown in FIG. 9D; or the entire first base layer 121 may also be oxidized, such that the base layer 120 in FIG. 9E is an alumina layer. In addition, in a case where the diameter and the depth of the first groove 131 of the first base layer 121 shown in FIG. 9C satisfy requirements, the oxidation and etching processes as shown in FIGS. 9D and 9E may need not to be performed, in which case, the first base layer 121 serves as the base layer of the reflective layer, and the base layer is the aluminum layer.

Figure 9F:
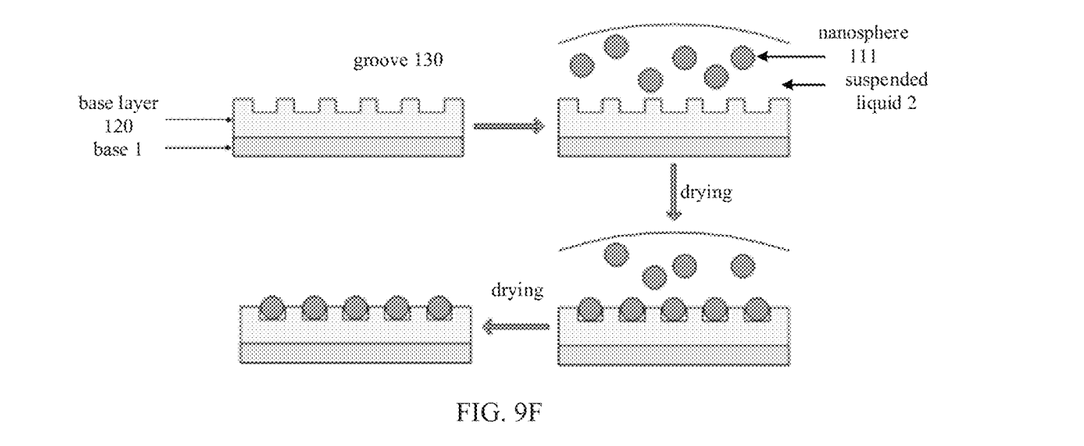

As shown in FIGS. 9E-9F, the suspended solution 2 containing nanospheres 111 is applied on the base layer 120 and then the suspended solution 2 is dried. During the drying process, the nanospheres 111 are automatically embedded into the grooves 130, thereby forming the reflective layer shown in FIG. 5.

For example, the nanospheres 111 may be nano-silica particles. Exemplarily, silica sphere particles with a diameter of 100 nm to 200 nm may be prepared using a sol-gel method. Anhydrous ethanol (99.7%), tetraethyl orthosilicate (98%), and deionized water are mixed a ratio of 1:6:2 to prepare a mixture A, and the mixture A is uniformly mixed for 2 hours at a constant temperature of 45° C. Ammonia water and absolute ethanol are mixed at a ratio of 1:2 to prepare a mixture B and the mixture B is slowly dropped into the mixture A by a dripping device at a constant temperature. After 3 to 5 hours for reaction after the dropping is over, a transparent sol is obtained and gel is obtained after standing and ageing the transparent sol. The gel is placed in vacuum at a temperature of 80° C. to be dried for 24 hours and dried gel is obtained. The dried gel is calcined at a temperature of 800° C. to remove impurities and constituent water contained in silicon dioxide and the silica particles are obtained. The prepared silica particles are completely dispersed, with an equiaxed shape and an average dimension of 100 nm to 200 nm.

For example, in the above-mentioned drying process, the principle of self-assembling (embedding) nano-silica particles into the grooves is as follows.

The molecular self-assembly nanofabrication has two advantages. First, the assembly structure is on molecular scale, which is far less than a structural scale that may be achieved by the current conventional nanofabrication. Second, the assembly structure has low costs and is easy for industrial production. The implementation of the molecular self-assembly needs three conditions. Firstly, the particles are small enough; secondly, the particles may move freely, i.e., the nanoparticles are usually placed in a liquid (constituting a suspended solution); and thirdly, particle diameters are uniform and constant. In the embodiments of the present disclosure, the silica spherical particles with a diameter of 100 nm-200 nm are placed in a liquid to form a suspended solution, fully satisfying the above-mentioned conditions, and implementing the molecular self-assembly.

The grooves formed using the porous alumina thin film implements surface topography orientation self-assembly of silica sphere particles on the base layer. The surface topography orientation refers to the fabrication of some accidented geometric figures on a solid surface by the conventional micro-nano fabrication, such as grooves (for example, forming grooves in the surface of the base layer). Due to limitations of physical boundaries, nanoparticles (the above-mentioned silica sphere particles) are only self-assembled in these grooves, the base layer formed with grooves functions as a template, and the template orientation is an important method for controlling self-assembly of nanoparticles. The self-assembly of the nanoparticles in the surface grooves is also dependent on an acting force of surface capillary caused by liquid (suspension) evaporation and liquid level reduction, so the evaporation of the suspension containing nanoparticles is essential for the self-assembly of the nanoparticles in the surface grooves. The reason why the nanoparticles may fall into the surface grooves is that the grooves may suppress a shrinkage of the liquid level when the liquid shrinks in volume and surface area due to evaporation. Further evaporation of a liquid level of the liquid remaining in the groove enables the nanoparticles containing in the liquid to be embedded in the grooves, so as to achieve the self-assembly of the nanoparticles.

For example, in at least one embodiment of the present disclosure, the base layer may be immersed in a suspended solution containing nanospheres (e.g., the suspension formed by mixing deionized water with silica sphere particles) at a constant temperature of 50° C. and stands for 10 hours, until the suspension is slowly evaporated, and the silica sphere particles fall into the grooves due to the acting force of surface capillary caused by the liquid evaporation and the liquid level reduction.

The above-mentioned self-assembly process of the nano silica may avoid high requirements for lithography precision due to a formation of the metasurface with the convex structure by a photolithography process.

The following statements should be noted.

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness a layer or area may be enlarged or narrowed, that is, the drawings are not drawn in a real scale.

(3) In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. A display substrate, comprising a display area and a reflective layer, wherein
at least a portion of the reflective layer is in the display area; and
the reflective layer comprises a metasurface facing a display side of the display substrate, and the metasurface comprises a plurality of convex structures which have metamaterial properties and are scattered;
the reflective layer further comprises a base layer, and the base layer comprises a plurality of grooves facing the display side of the display substrate;
the plurality of convex structures are in one-to-one correspondence with the grooves, and each of the plurality of convex structures is overlapped with the corresponding groove in a direction perpendicular to a plane that the reflective layer is located and protrudes from a surface of the base layer.

2. The display substrate according to claim 1, wherein the plurality of convex structures are in an array.

3. The display substrate according to claim 1, further comprising a plurality of sub-pixels arranged in an array in the display area,
wherein each of the sub-pixels comprises a pixel electrode;
the pixel electrode is facing the metasurface of the reflective layer, or on a side of the reflective layer away from the metasurface.

4. The display substrate according to claim 1, wherein the base layer is made of a porous material.

5. The display substrate according to claim 4, wherein the base layer is a porous alumina layer or a porous titanium oxide layer.

6. A display panel, comprising the display substrate according to claim 1.

7. The display panel according to claim 6, further comprising an opposed substrate and a liquid crystal layer, wherein
the opposed substrate and the display substrate are arranged oppositely to form a cell, and the liquid crystal layer is between the opposed substrate and the display substrate.

8. A method of manufacturing a display substrate, the display substrate comprising a display area, the method comprising:
forming a reflective layer at least in the display area,
wherein the reflective layer comprises a metasurface facing a display side of the display substrate, and the metasurface comprises a plurality of convex structures which have metamaterial properties and are scattered; and
wherein forming the reflective layer comprises forming a base layer, wherein the base layer comprises a plurality of grooves, the plurality of convex structures are in one-to-one correspondence with the grooves, and each of the plurality of convex structures is overlapped with the corresponding groove in a direction perpendicular to a plane that the reflective layer is located and protrudes from a surface of the base layer.

9. The manufacturing method according to claim 8, wherein forming the reflective layer further comprises:
applying nanospheres on the base layer, to allow the nanospheres to be in the grooves,
wherein portions of the nanospheres protruding from the groove form the plurality of convex structures.

10. The manufacturing method according to claim 9, wherein
at least one of the nanospheres has a diameter ranging from 100 to 200 nanometers, a diameter of each of the grooves ranges from 150 to 250 nm, and a minimum spacing between adjacent grooves ranges from 100 to 200 nm.

11. The manufacturing method according to claim 9, wherein forming the base layer and applying the nanospheres on the base layer comprises:
depositing a metal material to form a metal thin film and oxidizing a surface portion of the metal thin film to form a first metal oxide layer with plural pores, wherein an unoxidized portion of the metal thin film is formed as the base layer;
removing the first metal oxide layer, wherein a plurality of grooves corresponding to the plural pores are formed in a surface of the base layer; and
applying a suspended solution containing nanospheres on the surface of the base layer and evaporating the suspended solution, to embed the nanospheres in the grooves.

12. The manufacturing method according to claim 11, wherein the forming a base layer with grooves and applying nanospheres further comprises:
oxidizing the surface of the base layer before the suspended solution is applied, to increase a depth of the grooves; and/or
etching the surface of the base layer with an etching solution to increase a diameter of the grooves.

13. The manufacturing method according to claim 12, wherein the metal material is aluminum; the oxidizing the surface of the base layer and/or oxidizing the surface of the base layer comprises:
performing oxidation by taking the metal thin film and/or the base layer as an anode, wherein an oxidation voltage of the anode is 30-50V, a electrolyte is an oxalic acid electrolyte with a concentration of 0.3 mol/L, and a temperature is 5-10° C.

* * * * *